(12) United States Patent
Lisiak et al.

(10) Patent No.: US 11,639,879 B2
(45) Date of Patent: May 2, 2023

(54) LINEAR FORCE SENSOR AND METHOD OF USE

(71) Applicant: FUTEK Advanced Sensor Technology, Irvine, CA (US)

(72) Inventors: Maciej Lisiak, San Clemente, CA (US); Sasan Vosough, Lake Forest, CA (US)

(73) Assignee: FUTEK Advanced Sensor Technology, Irvine, CA (US)

( * ) Notice: Subject to any disclaimer, the term of this patent is extended or adjusted under 35 U.S.C. 154(b) by 226 days.

(21) Appl. No.: 17/186,100

(22) Filed: Feb. 26, 2021

(65) Prior Publication Data

US 2021/0181048 A1   Jun. 17, 2021

Related U.S. Application Data

(63) Continuation-in-part of application No. 16/601,770, filed on Oct. 15, 2019, now Pat. No. 11,079,292.

(51) Int. Cl.
*G01L 5/108*   (2020.01)

(52) U.S. Cl.
CPC .................. *G01L 5/108* (2013.01)

(58) Field of Classification Search
CPC ..... G01L 5/12; G01L 5/10; G01L 5/04; G01L 5/045; G01L 1/2218; A61H 1/0288
See application file for complete search history.

(56) References Cited

U.S. PATENT DOCUMENTS

| | | | |
|---|---|---|---|
| 3,004,231 A | 10/1961 | Laimins | |
| 3,261,204 A | 7/1966 | Jacobson | |
| 3,376,537 A | 4/1968 | Pugnaire | |
| 3,381,527 A | 5/1968 | Grubbs | |
| 3,481,189 A * | 12/1969 | Brennan | G01B 7/18 73/768 |
| 3,513,431 A * | 5/1970 | Kovacs | G01L 1/2231 73/862.634 |
| 3,662,596 A | 5/1972 | Siefert | |
| 3,866,473 A | 2/1975 | Teitelbaum et al. | |
| 3,930,918 A * | 1/1976 | Cernik | G01M 17/02 73/146 |
| 3,969,935 A | 7/1976 | Shoberg | |
| 4,065,962 A * | 1/1978 | Shoberg | G01G 3/1404 73/862.633 |
| 4,275,599 A * | 6/1981 | Kohlenberger | G01B 11/16 33/787 |
| 4,402,229 A | 9/1983 | Byrne | |
| 4,423,793 A | 1/1984 | Caris | |

(Continued)

*Primary Examiner* — Tran M. Tran (74) *Attorney, Agent, or Firm* — Young Basile Hanlon & MacFarlane, P.C.

(57) ABSTRACT

A device for attachment to a linear force transmission medium such as a wire or rod includes a flexure body having axially aligned tubular extensions on opposite ends that can receive and be crimped to the medium to create a continuous path for tensile force transmission. The flexure carries strain gages on top and bottom planar surface portions that are connected into a bridge circuit that responds to stress in the flexure body. Leads are protected against disconnection from solder pads by wrapping the leads and a carrier for them around the exterior circumferential surface of a jacket that fits on and around the flexure body. An FPC plug embodiment is disclosed.

13 Claims, 13 Drawing Sheets

(56) References Cited

U.S. PATENT DOCUMENTS

| | | |
|---|---|---|
| 4,789,035 A | 12/1988 | Hamilton et al. |
| 4,803,888 A | 2/1989 | Choquet |
| 4,833,927 A | 5/1989 | Park |
| 4,840,521 A | 6/1989 | Bonnet |
| 4,899,599 A | 2/1990 | Eddens |
| 4,989,450 A | 2/1991 | Shoberg et al. |
| 5,052,233 A | 10/1991 | Rantala |
| 5,220,971 A | 6/1993 | Farr |
| 5,230,252 A | 7/1993 | O'Brien et al. |
| 5,277,406 A * | 1/1994 | Knight ............... B66D 1/50 114/213 |
| 5,461,933 A * | 10/1995 | Ives ............... G01L 1/2231 73/862.623 |
| 5,582,447 A * | 12/1996 | Leon ............... F16G 11/103 292/307 R |
| 5,925,832 A | 7/1999 | Bruns |
| 5,929,390 A | 7/1999 | Naito et al. |
| 6,125,708 A * | 10/2000 | Wang ............... G01B 7/18 73/862.49 |
| 6,311,564 B1 | 11/2001 | Martin et al. |
| 6,684,487 B2 | 2/2004 | Naito et al. |
| 6,957,588 B1 * | 10/2005 | Kicher ............... G01L 9/0027 73/726 |
| 7,155,348 B2 | 12/2006 | Loher et al. |
| 7,241,956 B1 | 7/2007 | Stimpson |
| 7,424,832 B1 | 9/2008 | Nunnelee |
| 7,424,996 B2 * | 9/2008 | Larsen ............... G01L 5/101 73/862.53 |
| 7,971,488 B2 * | 7/2011 | Sturzer ............... B60T 13/746 73/760 |
| 8,024,980 B2 | 9/2011 | Arms et al. |
| 8,056,423 B2 | 11/2011 | Abdallah et al. |
| 8,371,177 B2 * | 2/2013 | Ihrke ............... B25J 9/1045 73/826 |
| 8,474,331 B2 | 7/2013 | Pekin |
| 83,474,331 | 7/2013 | Pekin |
| 8,890,516 B2 * | 11/2014 | Tsukada ............... G01L 5/102 73/774 |
| 9,120,220 B2 * | 9/2015 | Bergelin ............... A61H 1/0288 |
| RE45,883 E | 2/2016 | Ohbayashi et al. |
| 9,464,949 B2 | 10/2016 | Mahlen et al. |
| 9,527,694 B2 | 12/2016 | Barea |
| 9,791,332 B2 | 10/2017 | Jaeger et al. |
| 9,969,451 B2 * | 5/2018 | Sasaki ............... B62M 3/086 |
| 10,001,419 B2 * | 6/2018 | Kolbenschlag ....... G01L 3/1435 |
| 10,302,510 B2 | 5/2019 | Baker et al. |
| 10,495,534 B2 * | 12/2019 | Kelly ............... G01L 9/0051 |
| 10,663,359 B2 | 5/2020 | Zach et al. |
| 10,765,428 B2 * | 9/2020 | Sgroi, Jr. ........... A61B 17/3494 |
| 10,816,420 B1 * | 10/2020 | Litteken ............... G01L 5/102 |
| 10,996,121 B2 * | 5/2021 | Burrow ............... G01G 3/14 |
| 2011/0088489 A1 | 4/2011 | Yamamoto |
| 2011/0259110 A1 | 10/2011 | Smith |
| 2013/0279298 A1 * | 10/2013 | Prentice ............... B63B 21/20 367/131 |
| 2014/0041458 A1 | 2/2014 | Smith |

* cited by examiner

LINEAR FORCE SENSOR AND METHOD OF USE

CROSS-REFERENCE TO RELATED APPLICATION

This application is a continuation-in-part of U.S. patent application Ser. No. 16/601,770 filed Oct. 15, 2019 the entire disclosure of which is hereby incorporated by reference.

FIELD OF THE INVENTION

This invention is in the field of force sensors of the type that are easily attachable to linear force transmission media such as wires and rods by, for example, a simple crimping step. The sensor includes a flexure body with strain gages strategically attached to it for producing signals representing tension and/or compression forces transmitted by and through the medium.

BACKGROUND OF THE INVENTION

It is known to use tensiometers to measure static tension in a linear medium such as a wire or cable. A tensiometer may be constructed with a frame adapted to hang on the cable or wire. The frame carries two spaced rollers that contact the cable or wire. An adjustable element on the frame between the rollers is used to apply a lateral force to the cable or wire, causing it to bend out of a straight path between the rollers. See U.S. Pat. No. 7,424,832 to Nunnelee. A further example of a tensiometer is shown in U.S. Pat. No. 4,989,450 to Shoberg.

SUMMARY OF THE DISCLOSURE

As disclosed herein, a sensor in the form of a flexure body with stress concentration features is attached to a linear force transmission medium such as a wire, rod or the like by passing the medium through a longitudinal passage in the body and mechanically connecting the flexure body to the medium at two longitudinally spaced points on opposite sides of the stress concentration areas. The medium may pass fully through the flexure body or, alternatively, be divided into two sections; each section being attached to a different end of the body.

The flexure body in the disclosed embodiments has a longitudinal axis, a circumferential outer surface and a passage extending along the longitudinal axis. Stress concentration areas in the body include a lateral aperture trough the body that intersects the longitudinal/axial axis, and a lateral slot extending across one or both opposite planar portions of the circumferential exterior surface of the flexure body wherein the slot or slots are spaced longitudinally from the lateral aperture. Strain gages forming a bridge circuit are adheringly attached to one or both of the planar portions of the body surface where they substantially overlie the stress concentration area or areas but not the slots. The strain gages forming the bridge circuit are connected electrically to solder pads which are on the same surface as the strain gages and are easily reached by tooling to make the solder connections.

In several embodiments, leads from the bridge circuit are wrapped around the flexure body for accidental disengagement protection and are insulated from the body either by wrapped wire insulation or by applying the leads to a lead carrier film which is flexible and can be wrapped around the flexure body and extended to a remote device such as a display or recorder with a supply voltage source and other features. In still another embodiment a jacket custom fitted to the flexure body is installed on and over the circumferential surface of the body and the leads are wrapped around the outer surface of the jacket either directly or on a flexible film lead carrier. In an illustrative embodiment, an arch is formed on and integral with the top of the jacket to create a passage through which the leads and/or lead carrier film passes after being wrapped around the longitudinal axis of the flexure. In the embodiment in which the strain gage bridge circuit is divided, two gages are arranged on one planar surface and two on the opposite planar surface, and the lead carrier is designed to connect leads to the top mounted strain gages and then wrap circumferentially 180 degrees around to the bottom surface where leads are connected to the bottom-mounted gages, and then wrap further around the jacket and flexure body to extend through a top arch passage to the remote device. In still another embodiment the bridge circuit is connected directly to an FPC plug device and no jacket is required. All embodiments lend themselves to miniaturization; i.e., to the fabrication and use of a sensor with an axial length on the order of 5 millimeters, suitable for use in surgical applications using robotic devices. The sensor is strategically designed to make the assembly of such a small device possible.

In use, a force transmitting medium such as a wire is either threaded fully through the flexure body via the axial passage or, in the case of a divided wire, simply inserted into each of two tubular extensions on opposite ends of the flexure body. Thereafter, the tubular extensions which are integral with the body are deformed mechanically such as by crimping to effectively permanently affix the flexure body to the medium so that any strain in the medium is transmitted to the flexure body. This transmitted strain causes a deformation of the flexure proximate the stress concentration areas which deformation affects the strain gage bridge circuit to unbalance the bridge and generate electrical signals that are communicated by one of several different mechanisms to the outside world. In an embodiment disclosed here, the mechanism includes leads which are carried by a elongate flexible and insulative film carrier. In another embodiment this lead carrier film is attached to and essentially wrapped around a jacket that fits over and around the circumferential exterior surface of the flexure body but is configured in such a way as to provide clearance slots for the strain gages and the solder pads. The lead carrier is configured in such a way as to be routed longitudinally under the jacket and then laterally out through slots to extend out from under the jacket and then wrap fully around the exterior circumferential surface of the jacket and, in the disclosed embodiment, through a passage formed by an arch integral with the top of the jacket. The leads may be connected not only to a supply voltage source but also to a device such as a meter or recording device or computer that extracts, calibrates, and utilizes information from the electrical signals produced by bridge circuit. As explained above, the solder pads may alternatively be connected to an FCP device which is also then communicated by appropriate wires or leads to a remote device.

BRIEF DESCRIPTION OF THE DRAWINGS

The illustrative embodiments to the invention are here and after described in accordance with 35U.S. C. § 112 which description is to be taken with the accompanying drawing in which.

DETAILED DESCRIPTION OF THE ILLUSTRATIVE EMBODIMENTS

Figure 1:
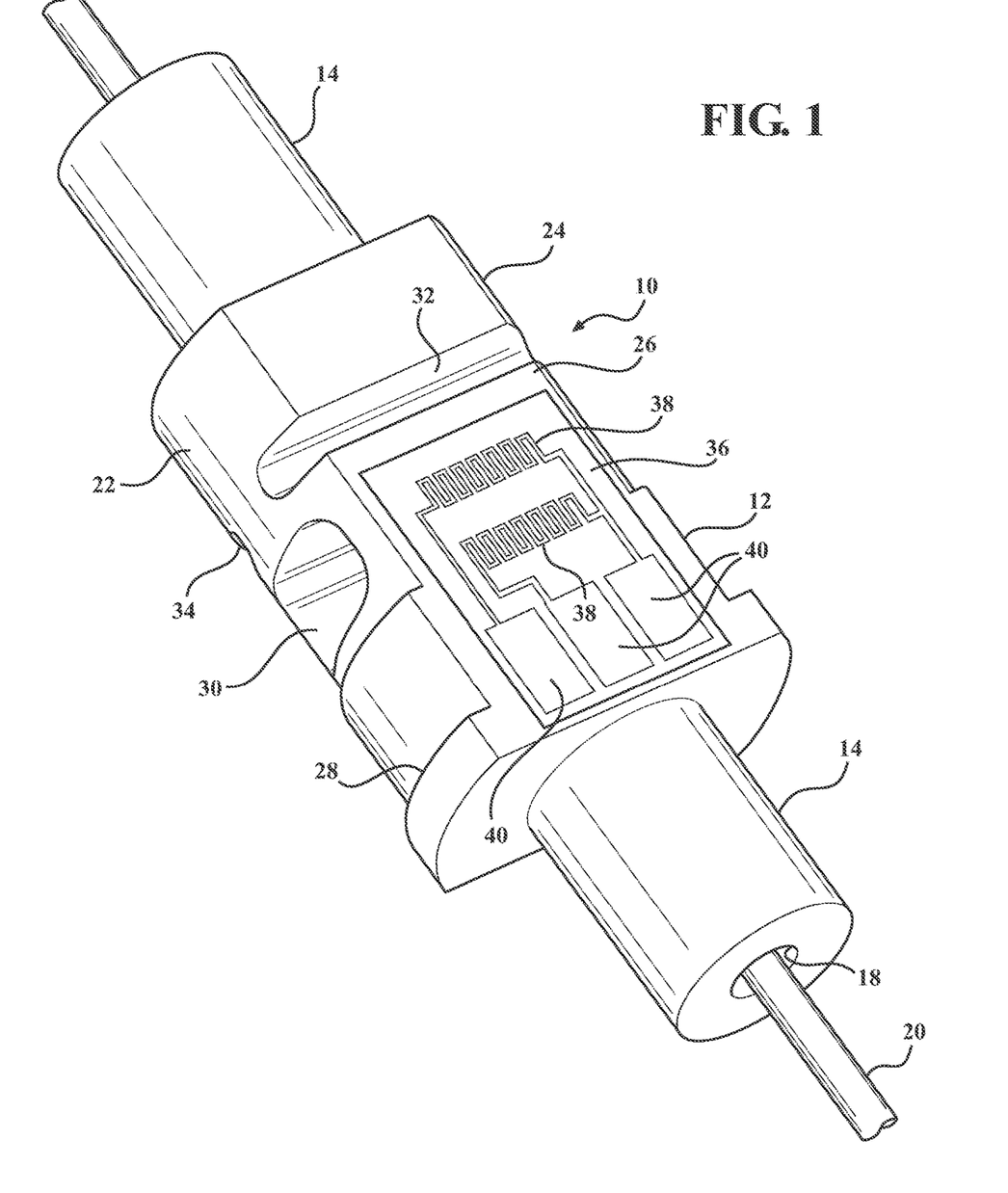
FIG. 1 is a perspective view of a flexure body with the modifications made to produce stress concentration areas and with half of a strain gage bridge circuit applied to a planar top surface thereof.
Figure 2:
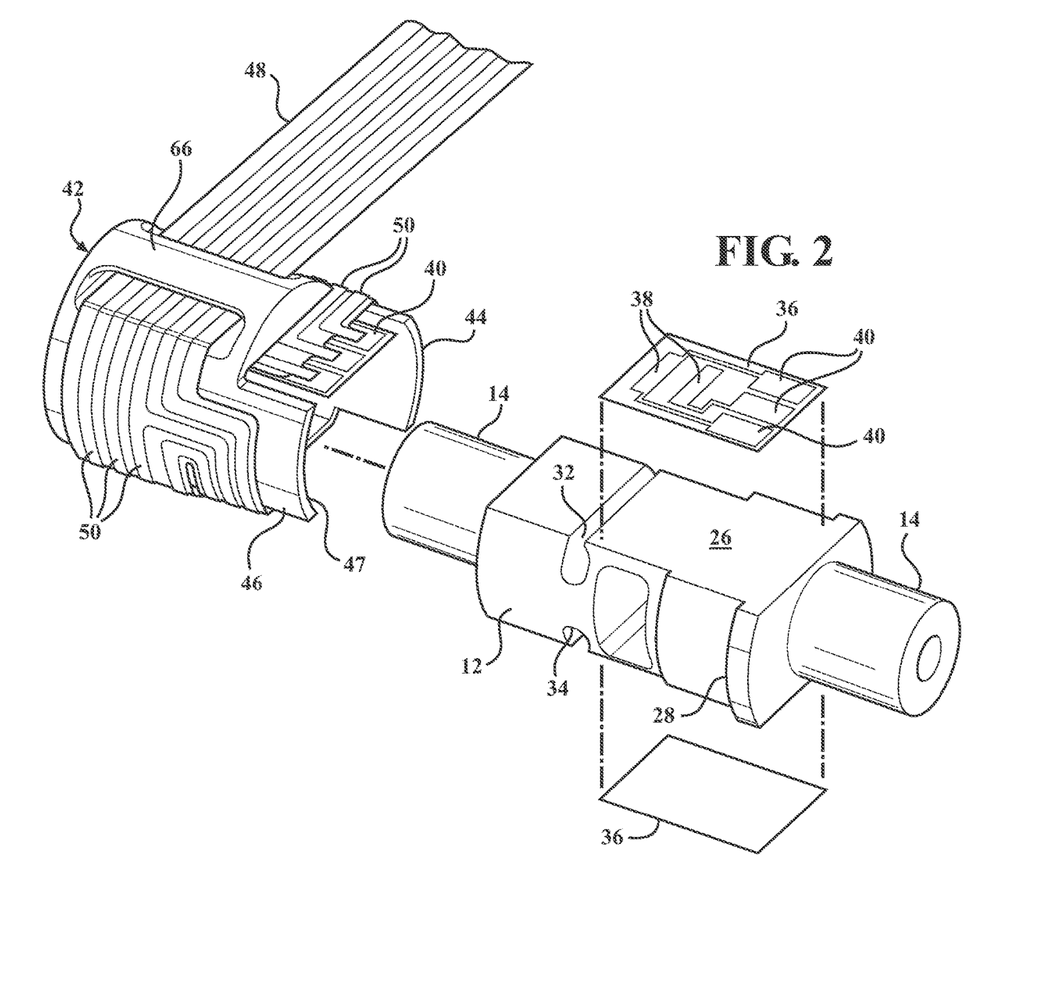
FIG. 2 is an exploded view of the flexure body of FIG. 1 along with a jacket that fits around and over the flexure body and supports a flexible lead carrier for printed conductive leads that connect the strain gages into a bridge circuit and wrap the leads around the jacket for damage protection.

Referring to FIGS. 1 and 2, there is shown a sensor 10 comprising a flexure body 12 made in one-piece with deformable tubular extensions 14 extending axially from the opposite ends. A longitudinal passage 18 located along the longitudinal axis of the flexure body 12 passes through the body and the integral extensions in uninterrupted fashion. The passage 18 provides a location for a load transmission medium 20, here in the form of a wire, to pass fully through the body. The wire can transmit tension and/or compression force from a robotic controller to or from a work area such as a surgical site. The body 12 is, in this example, approximately 5 mm in length exclusive of the tubular extensions 14. If the medium 20 is discontinuous, each part is inserted only into an extension 14 and the flexure body then acts as the sole medium for transmitting force from one section of the medium 20 to the other. The passage 18 may also be discontinuous and extend only into and through the extensions 14.

The circumferential outer surface of the flexure body 12, by way of additional detail, has rounded left and right-side surface portions 22 and 24 and planar top and bottom surfaces 26 together defining a circumferential exterior surface. A flange on the near end as shown in FIG. 1 creates a shoulder 28 for location of a jacket 42 shown in FIG. 2 and described below.

A lateral aperture 30 passes fully through the body 12 intersecting the longitudinal axis and the passage 18 if it extends fully through the body 12 such that aperture 30 plays a part in creating stress concentration areas in the flexure body responding to both compression and tension forces. The aperture 30 works in cooperation with lateral slots 32 and 34 in the top and bottom planar surfaces, respectively, proximate but longitudinally spaced from the central axis of the lateral aperture 30.

Film pads 36 of insulating material are adhered to the top and bottom parallel planar surfaces 26 of the flexure body, respectively, to receive strain gages 38 and solder pads 40, the pads 40 being connected via plated tracings on the top surface to the strain gages 38. It is to be understood that in the embodiment of FIGS. 1-5, the Wheatstone bridge circuit shown in FIG. 3 comprises a total of four strain gages 38, two of which are mounted on the top surface pad 36 and the other two on a bottom surface pad which is identical to the top surface pad 36. Again this arrangement contributes to the miniaturization of the device. The gages 38 on the two pads 36 are interconnected into a bridge circuit shown in FIG. 3 by leads hereinafter described to form the bridge circuit as well as to connect the input and output points of the bridge circuit to a remote voltage supply and a readout device. It is also possible to mount all four bridge circuit strain gages on just one surface pad 36 but space considerations in a miniature flexure favor the divided bridge circuit shown and described herein.

The tubular extensions 14 are mechanically deformed by crimping after the wire 20 is threaded into them along the longitudinal passage 18 and properly located for the particular job application so that the flexure body 12 is effectively permanently connected to the wire medium 20 whereby axial loads in the wire are transmitted to the flexure body and are concentrated in the stress concentration areas by the aforementioned lateral aperture 30 and the lateral slots 32 and 34. The strain gages 38 respond to deformation of the flexure body 12 by changing in electrical resistance thereby unbalancing the bridge and producing a voltage output difference between the side nodes which produces the bridge output in a well-known manner.

Figure 1A:
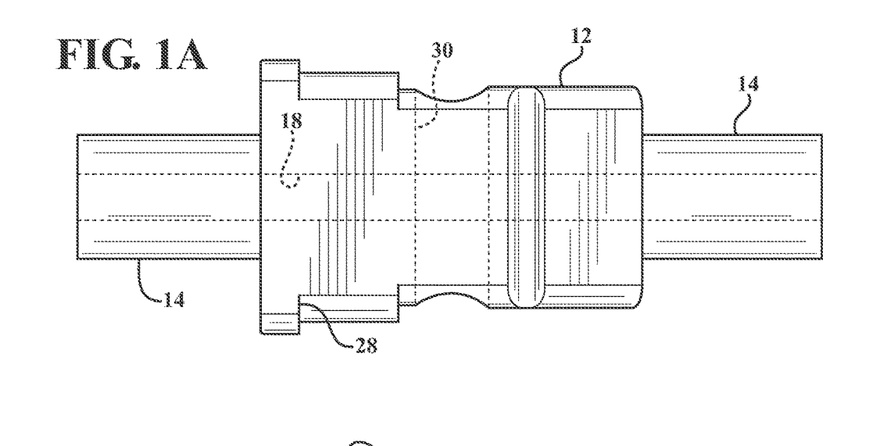
FIG. 1A is a top view of the flexure body without any application of strain gage elements and/or solder pads.

FIG. 1A shows the flexure body 12 from a vantage point which illustrates top surface 26, the longitudinal and the lateral passages 18 and 30 respectively, and the lateral slot 32 prior to the application of the film pad 36 for the strain gages 38 and the solder pads 40. The tubular extensions 14 are formed integrally with the flexure body and both are made of suitable high modulus of elasticity material such as aluminum, stainless steel and/or Inconel.

Referring now to FIGS. 2 and 5-16 details of the first embodiment of the sensor will be described in detail.

As shown in FIG. 2 the sensor body 12 is shaped to receive a jacket 42 with rounded sides 44 and 46 configured to fit snuggly on and over the rounded circumferential surfaces 22 and 24 of the flexure body 12 and edges 47 that abut the shoulder 28 when fully in place. The jacket may be adhered to the flexure body 12 only immediately adjacent the shoulder 28 so as not to interfere with deformation of the flexure body when subjected to a force, particularly in the areas of stress concentration. The jacket may be made of any of several dimensionally stable materials including metals and plastics.

Figure 3:
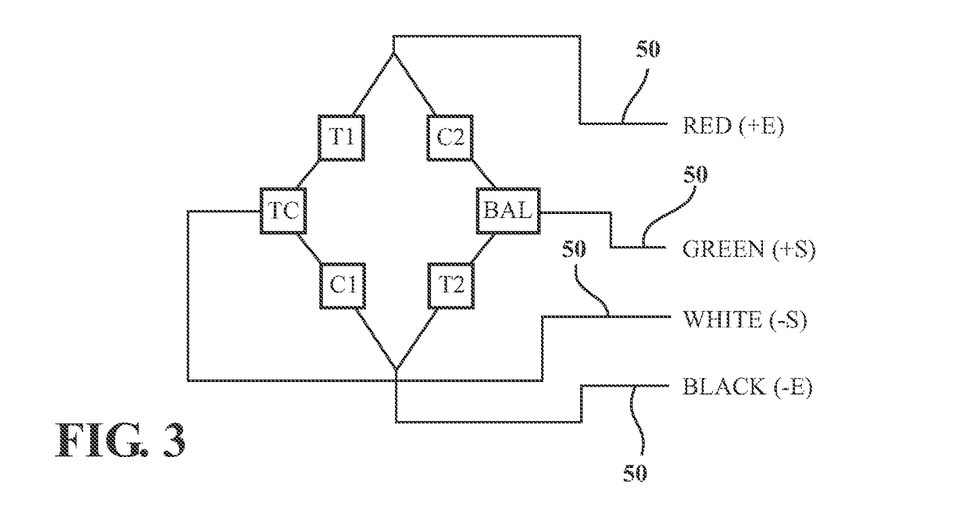
FIG. 3 is a Wheatstone bridge circuit.
Figure 4:
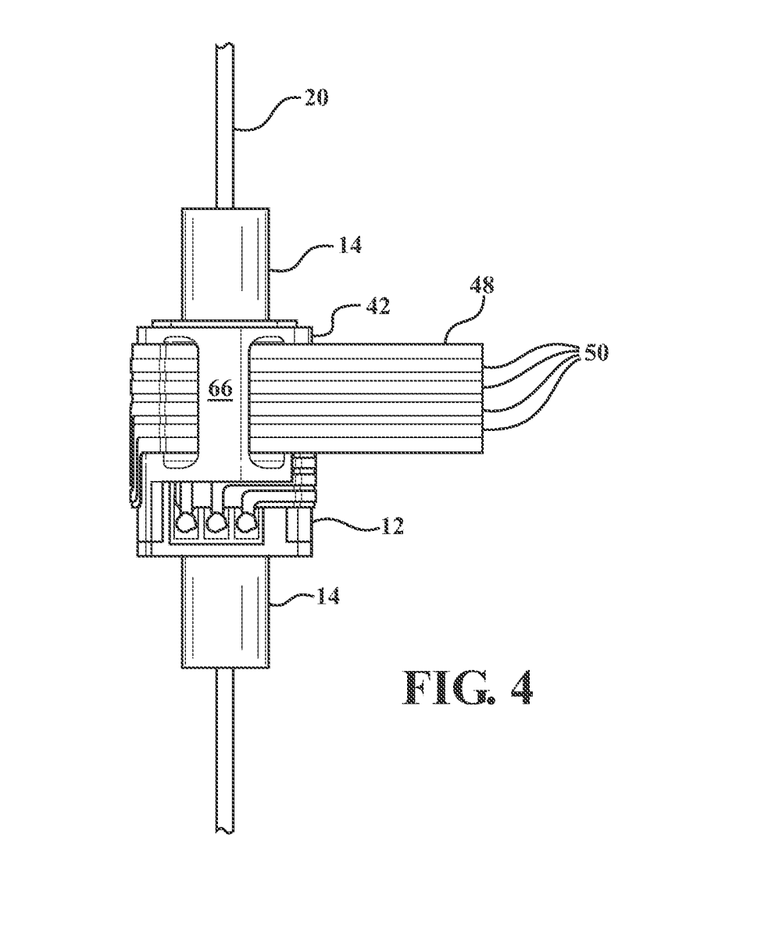
FIG. 4 is a top view of the embodiment of FIG. 2 in the assembled condition.

When fully installed the jacket 42 provides a support for an elongate insulate and flexible lead carrier 48 that carries printed conductive leads 50 from the strain gages and makes the connections described above. The leads are first arranged to form the bridge circuit of FIG. 3. The red and black leads shown in FIG. 3 are arranged to carry a supply voltage to the top and bottom nodes of the bridge circuit while the green and white leads are arranged to carry signals out from the side nodes of the bridge circuit in conventional fashion. The lead carrier 48, by virtue of its application to the jacket 42 in wrapped around fashion, provides protection against the detachment of the leads from the bridge circuit solder pads 40 due to accidental contact with the leads in use. In a test device, forces of up to 50 pounds have been tolerated.

By way of review, the bridge circuit shown in FIG. 3 is formed in two parts: there are two strain gages 38 on the top pad 36 and two more on the bottom pad. The strain gages are interconnected by solder pads 40 and leads 50 that are plated or otherwise applied to the outside surface of the lead carrier 42 so as to form the bridge circuit and to carry power into the bridge circuit and signals away from the bridge circuit as described above. Again, it is to be understood that the medium 20, be it a wire, rod, or other component, may be made in two parts. The end of one part is inserted into one of the extensions 14 and the extension is crimped to attach the body to this part of the medium. The other medium end is inserted into the opposite extension 14 and attached by crimping. In this arrangement, the forces delivered by the medium are carried only by the flexure body rather than by the parallel combination of the flexure and the medium. This arrangement adds sensitivity to the sensor and may be advantageous in some combinations. In both arrangements, the medium 20 and flexure body 12 are permanently joined.

Referring now to FIGS. 4, 5, and 7-16 the configuration of the lead carrier and the leads thereon for a two-part divided strain gage bridge circuit will be described in detail.

Figure 5:
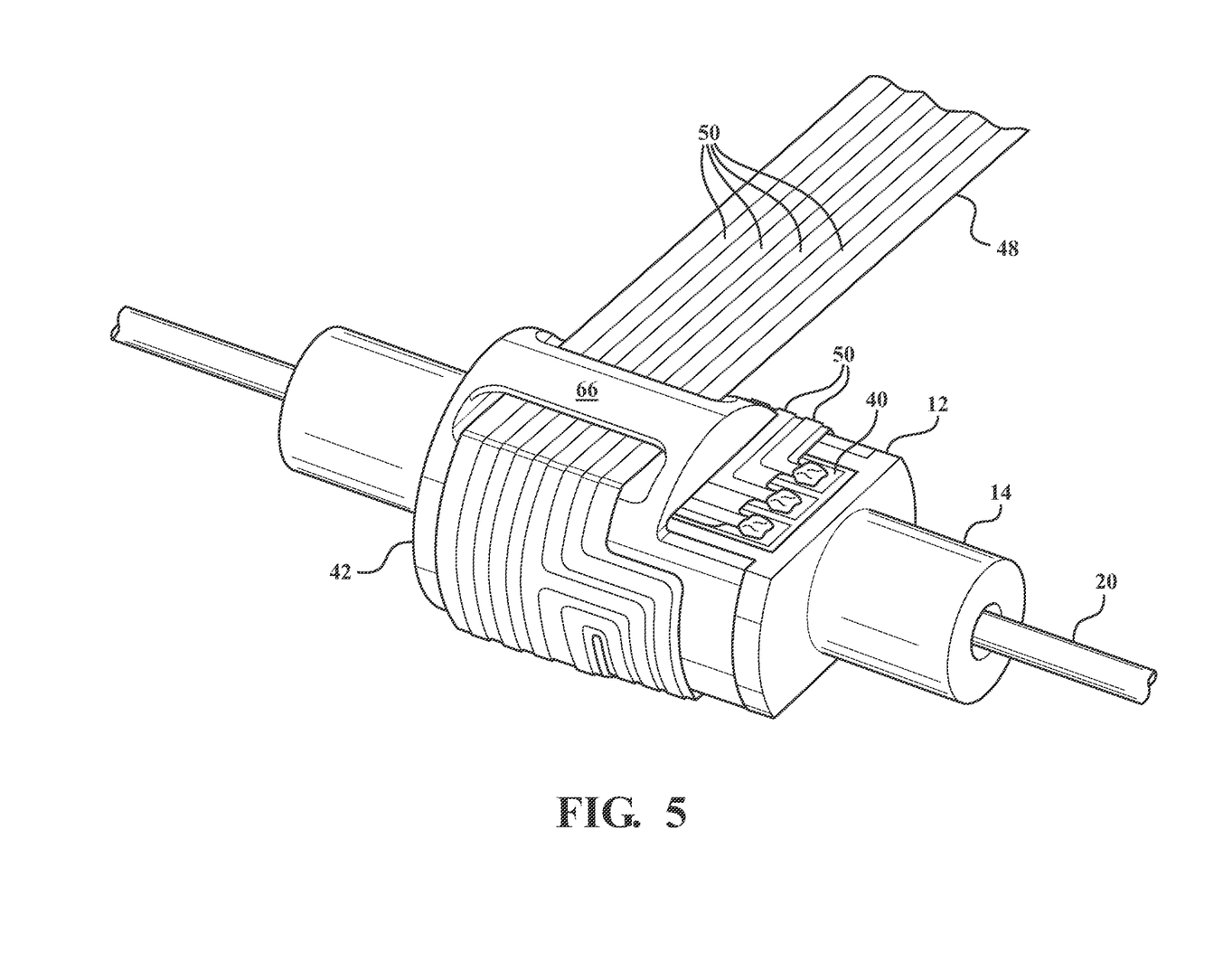
FIG. 5 is a perspective view of the assembled flexure body with jacket and lead carrier showing the leads extending off the lead carrier and connected by solder beads to the solder pads on one of the flexure body planar surfaces.
Figures 9, 10:
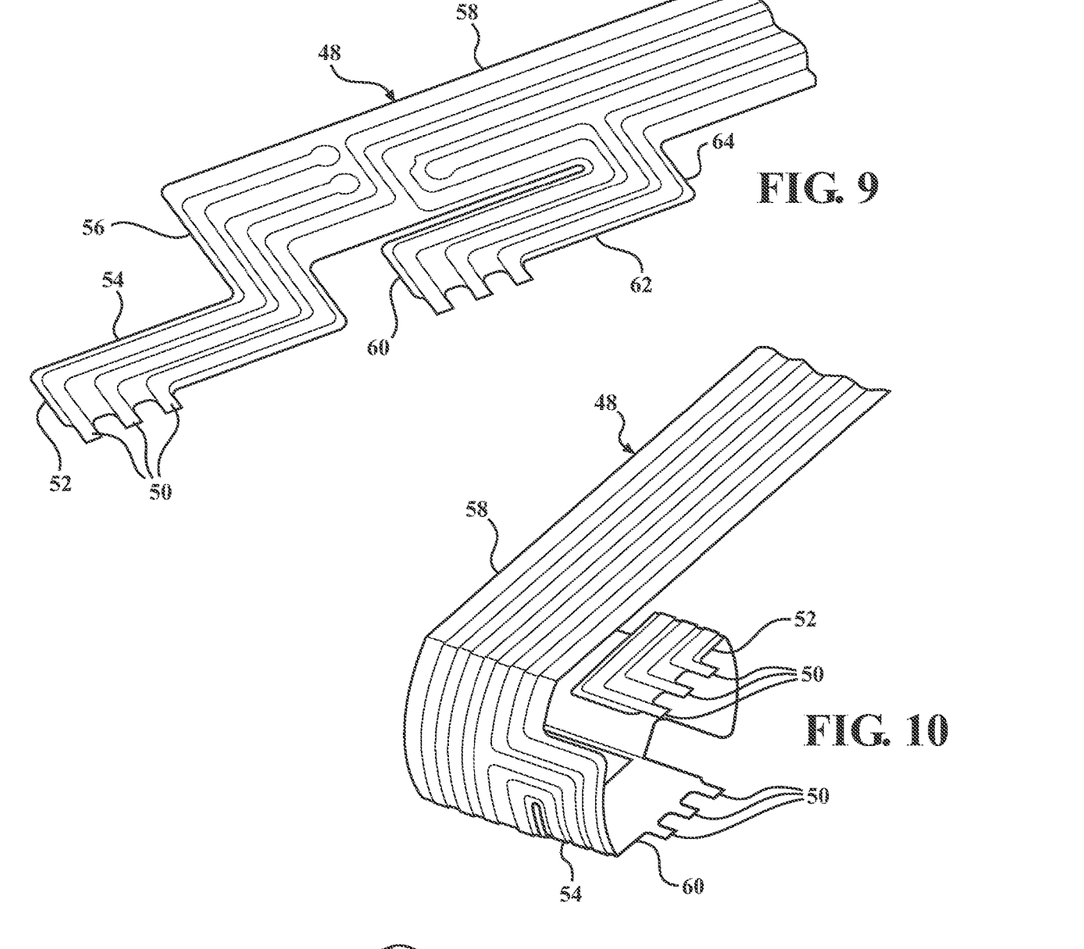
FIG. 9 is a perspective view of the lead carrier for a two-sided bridge circuit with printed leads in a flat condition.
FIG. 10 is a perspective view of the lead carrier of FIG. 9 in the wrapped condition.

Looking to FIGS. 4, 5, and 7-16, the lead carrier 48 includes a first leg portion 52 that extends leads 50 to the solder pads 40 on the top surface 26 of the flexure body 12. The carrier then turns 90° to form a second portion 54 that extends out from under the jacket 42 through a slot 53 best shown in FIGS. 8 and 11 and then wraps approximately 180 degrees or half-way around the outside surface of the jacket 42 and the flexure body 12. The lead carrier portion 56 shown in FIG. 9 joins the longer portion 58 as shown in FIG. 9 that carries the leads to a remote device. Portion 58 is joined by portions 60, 62, and 64 that together follow a zig-zag path which brings leads from the bottom mounted strain gages to the longer main portion 58 of the lead carrier 48. FIGS. 9 and 10 show the lead carrier 48 flat as it is originally fabricated whereas FIG. 10 shows the carrier in the wrapped configuration. The lead ends 50 on the short portions 50 and 52 are soldered to the pads 40 on the top and bottom of the flexure body 12 as shown in FIG. 5. A second slot 55, shown in FIG. 12C allows the portion 62 of the lead carrier to pass under the jacket and join the main portion 58 before wrapping further around the lead carrier.

Figure 11:
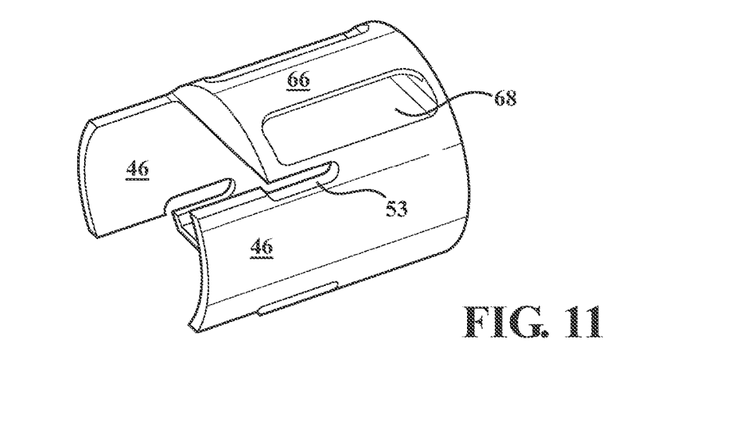
FIG. 11 is a perspective view of the jacket alone.
Figure 12A:
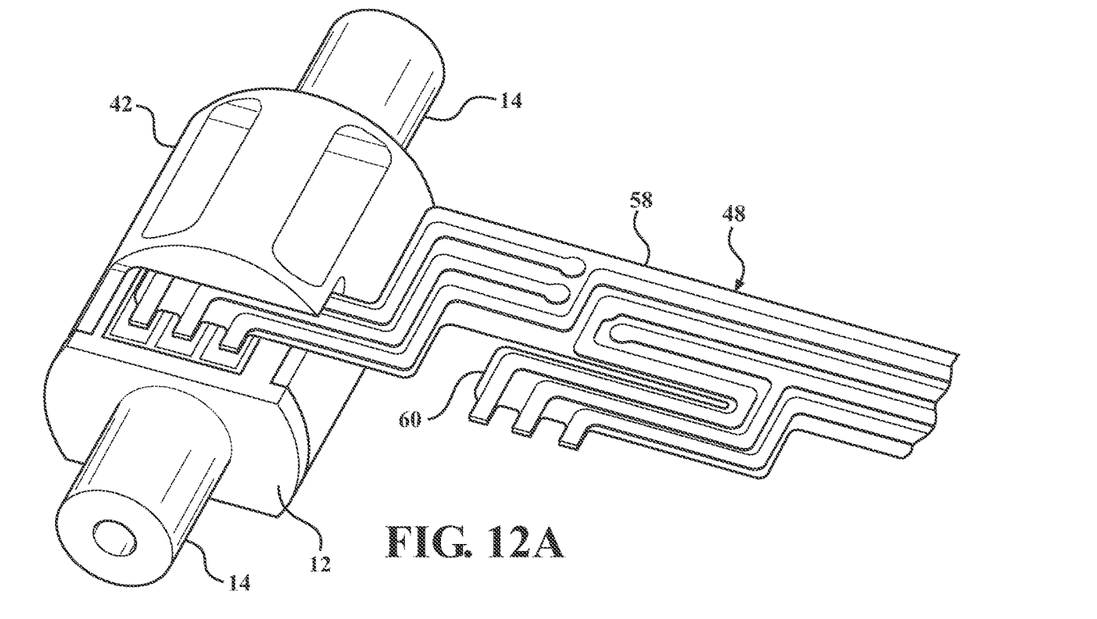
FIG. 12A shows the flexure body with jacket and with the lead carrier connected to one side of a bridge circuit but not wrapped around the flexure body.
Figure 12B:
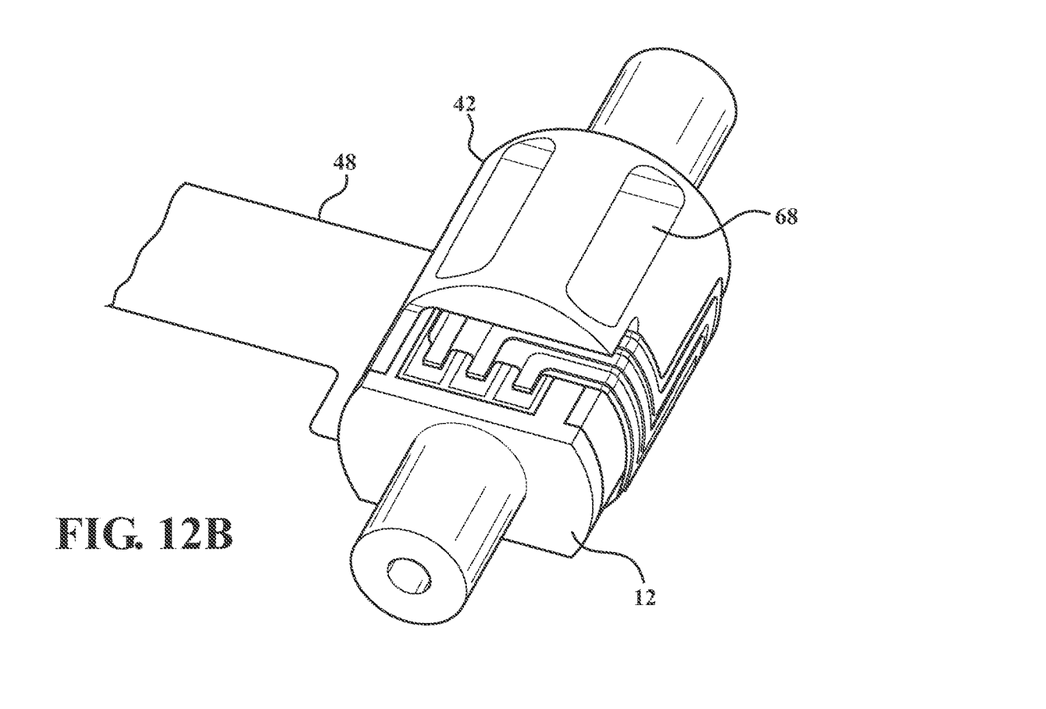
FIG. 12B shows the lead carrier and leads wrapped half-way around the flexure body and jacket.
Figure 12C:
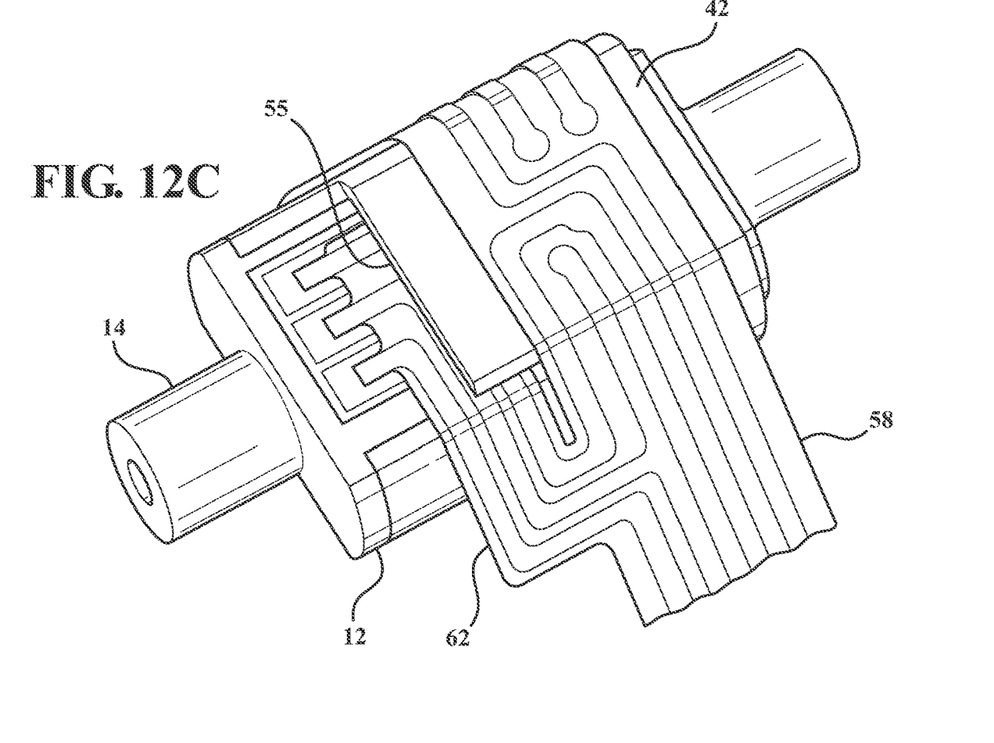
FIG. 12C is a bottom view of the partially wrapped lead carrier with the bottom bridge circuit elements in contact with the lower leads.
Figure 12D:
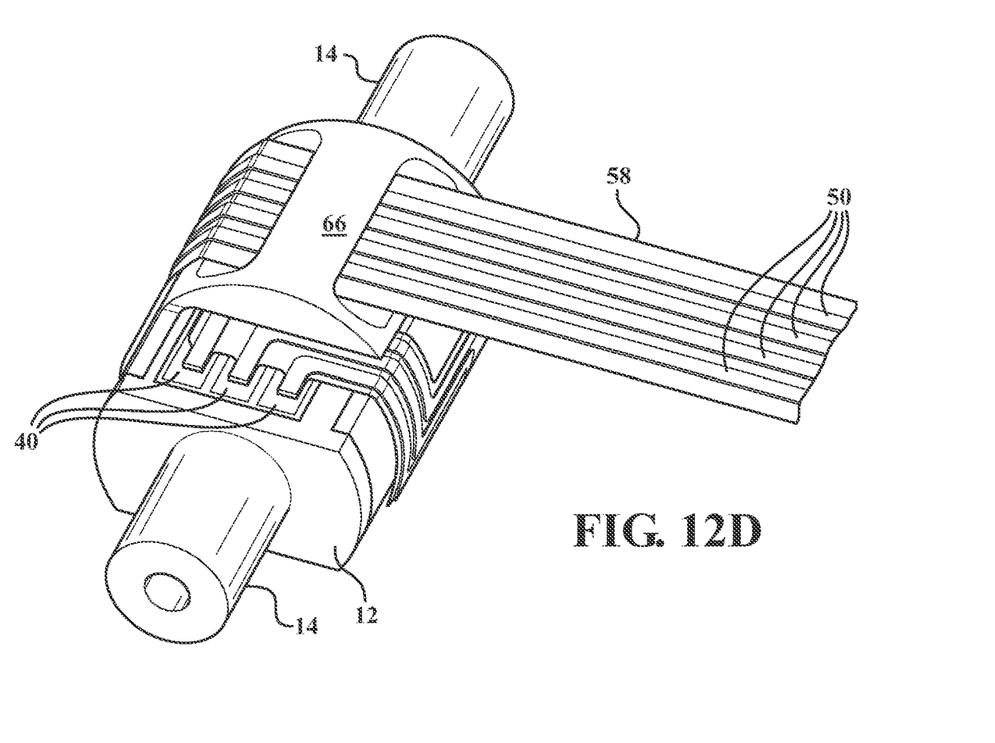
FIG. 12D shows the lead carrier fully wrapped around the jacket and passed through the arch passage.
Figure 13:
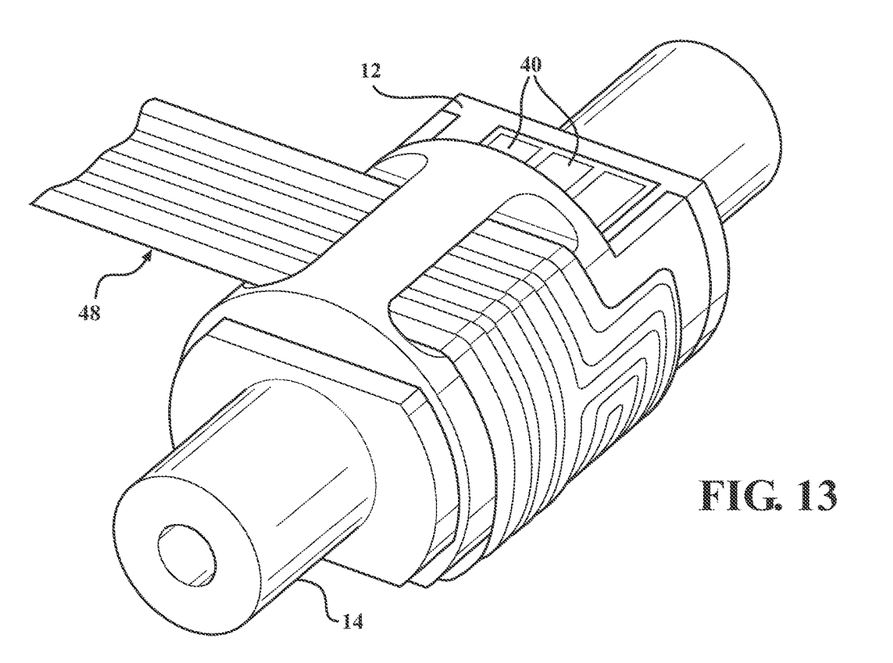
FIG. 13 is another view of the jacketed embodiment from a different angle.
Figure 14:
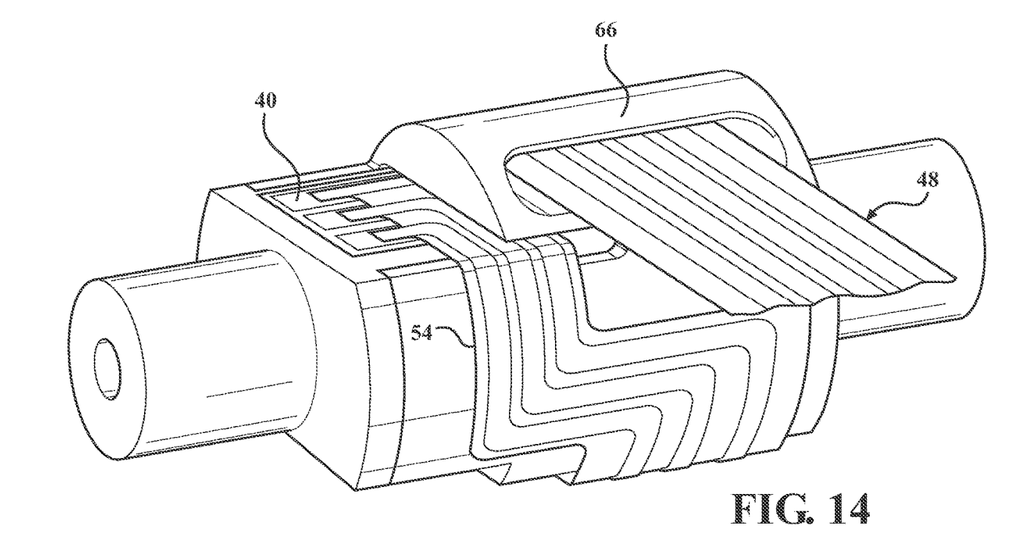
FIG. 14 is still another view of the fully wrapped embodiment from a still different angle.
Figure 15A:
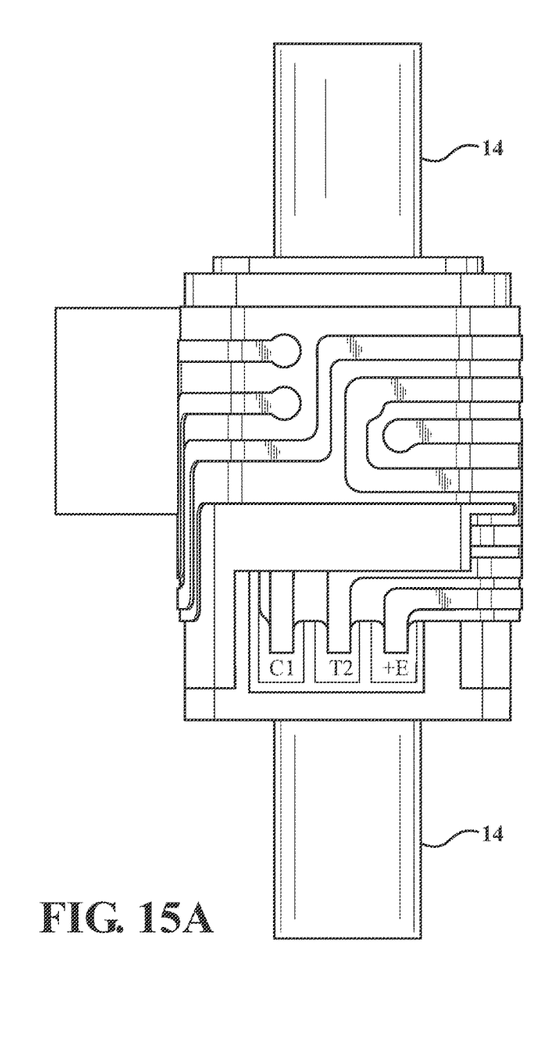
FIGS. 15A and 15B show details of the connections of the leads into the bridge circuit of FIG. 17.
Figure 15B:
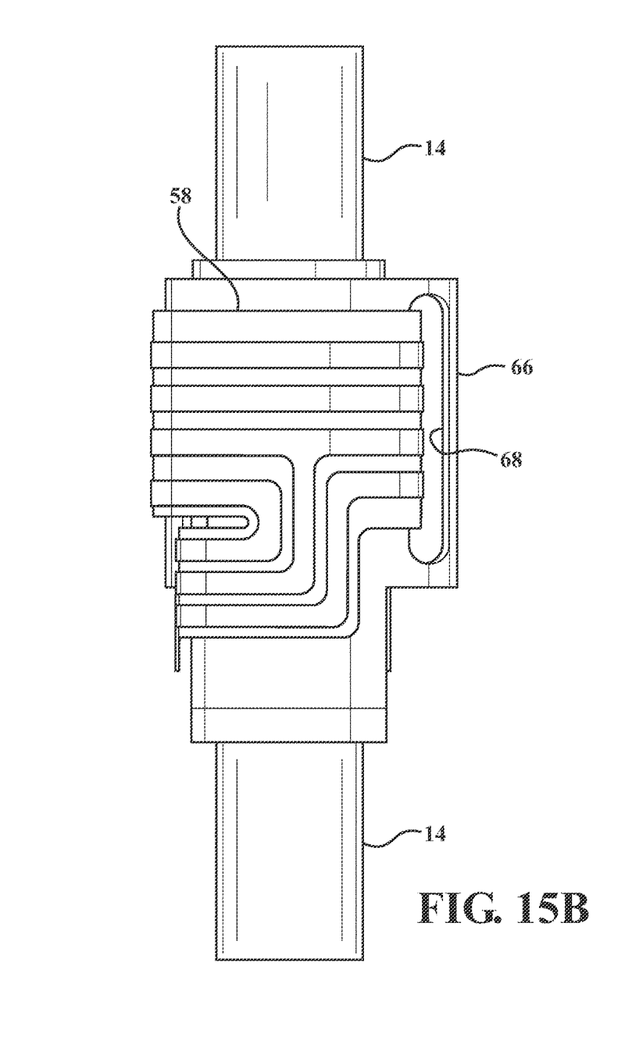

The jacket 42 is formed with an integral arch 66 on the top surface that creates a passage 68 through which the final portion 58 of the lead carrier 48 passes after being fully wrapped around the jacket 42. The arch provides further protection for the leads and the lead carriers as well as a place for labels and aesthetic features.

Figure 6:
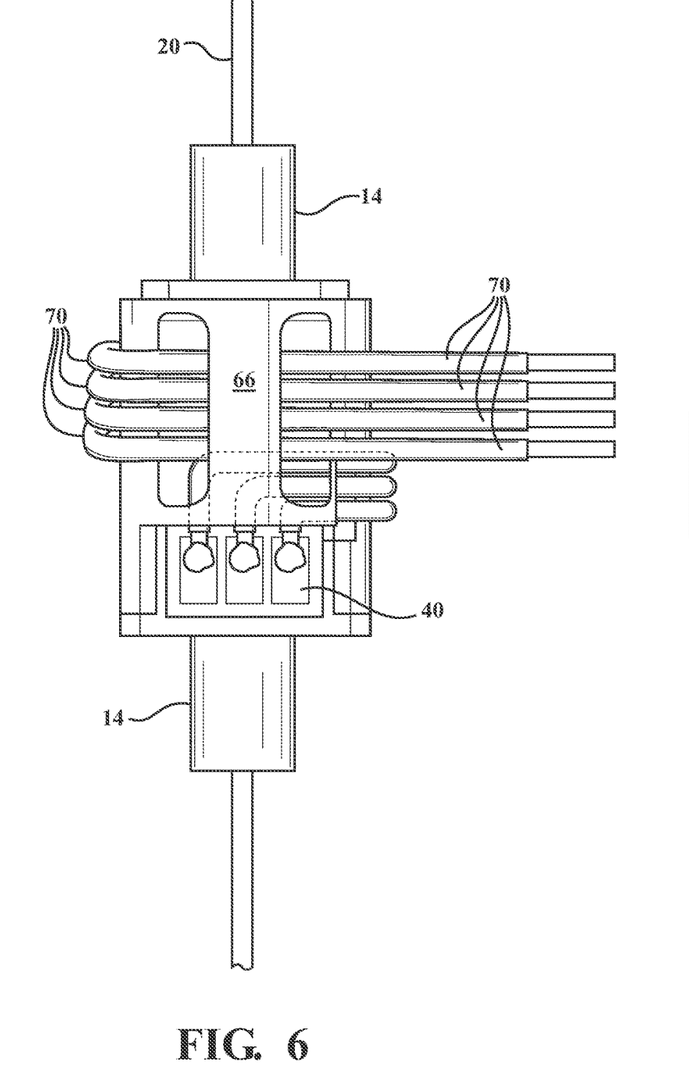
FIG. 6 is a top view of an alternative embodiment using insulated wires and without a separate lead carrier.
Figure 6A:
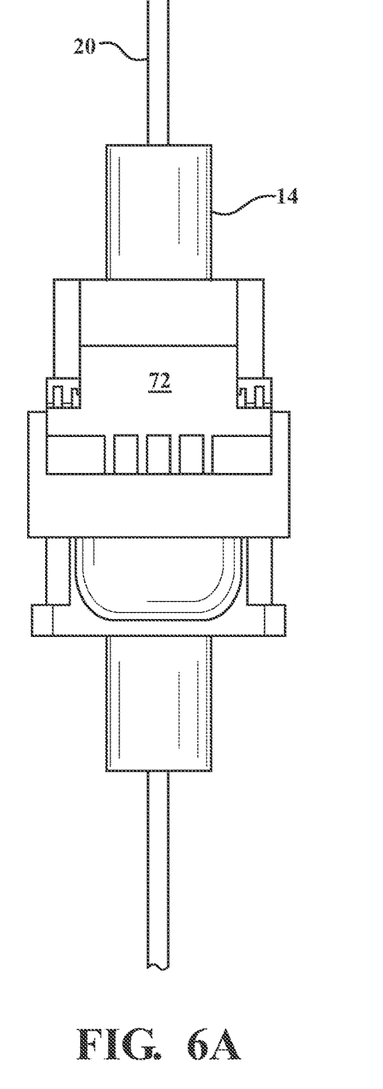
FIG. 6A is a view of a still further embodiment of the invention using an FCP plug as the transition or connector means from the bridge circuit to the outside world.
Figure 7:
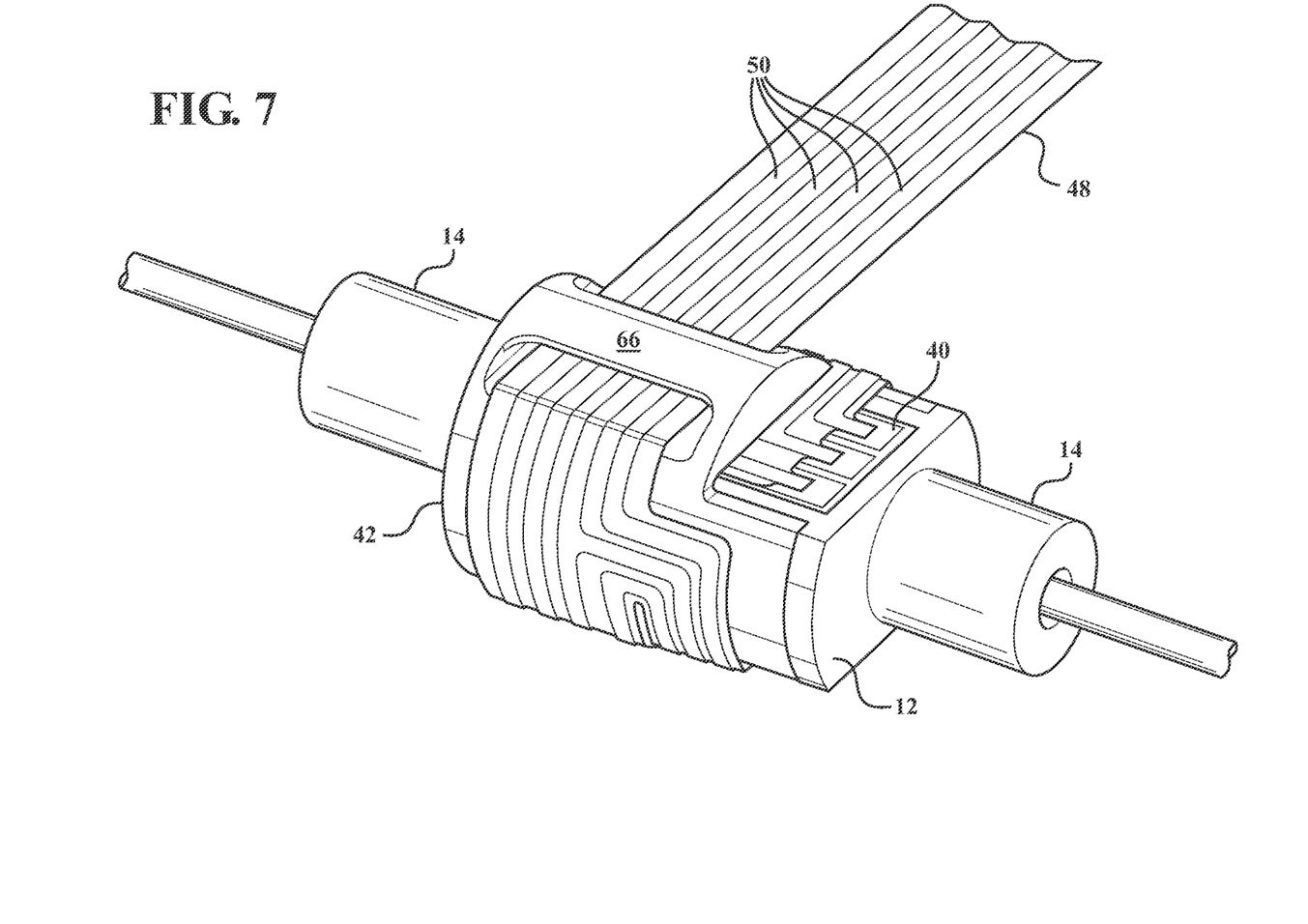
FIG. 7 is an assembled view of the flexure body similar to FIG. 2 but with the jacket and the lead carrier installed on the flexure body.
Figure 8:
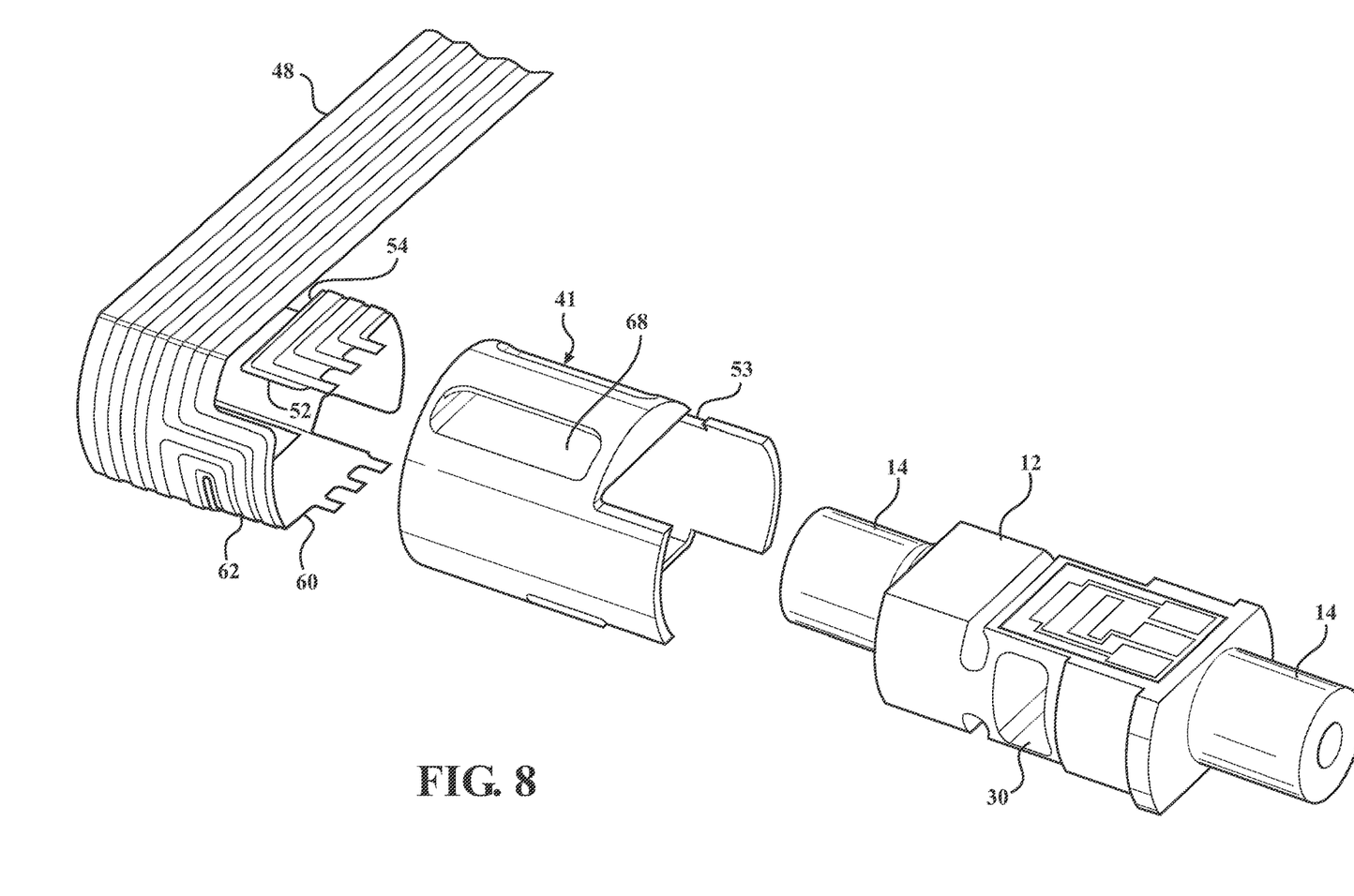
FIG. 8 is a perspective exploded view of the assembly of FIG. 7.

FIGS. 6 and 6A show alternative embodiments of the invention. In FIG. 6 insulated wires 70 are used to connect the strain gages and the bridge circuit to the outside world and require no lead carrier film for support. The exposed ends of the wires on the top side of the flexure extend out from under the jacket and are soldered to the pads 40 and wrap around the jacket and pass through the passage 68 under the top arch 66 as shown. The wires 70 may be adhered to the outside surface of the jacket as necessary to provide protection against damage or disconnection in the event of accidental stress loads applied to the wires.

FIG. 6A shows another alternative embodiment eliminating the wires, leads and the lead carriers in favor of an FCP plug device 72, which is connected to the strain gage circuits in conventional fashion.

Figure 16:
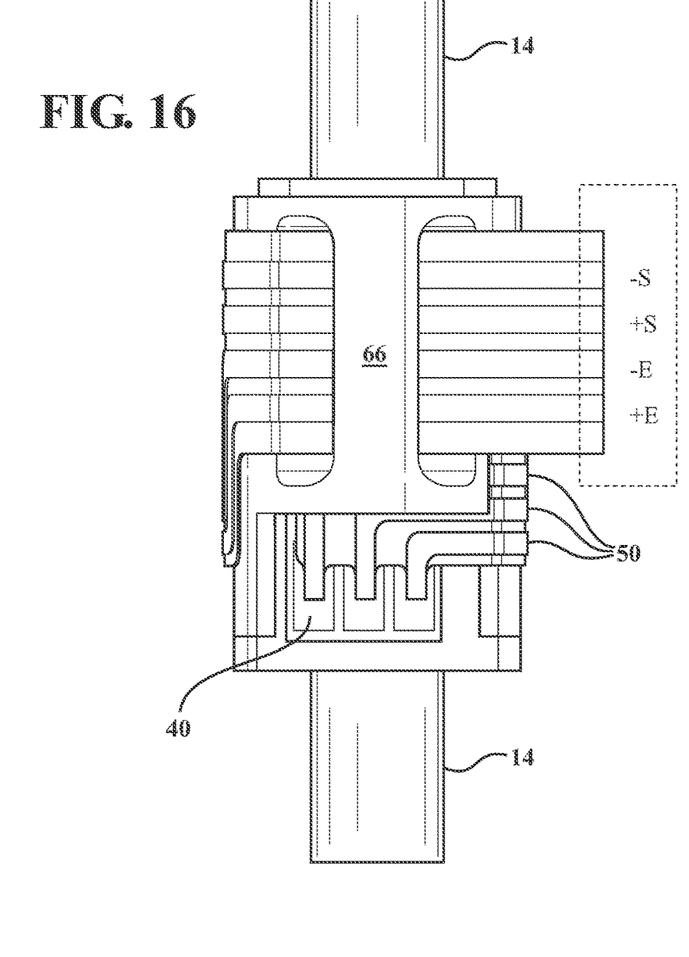
FIG. 16 shows the top of the assembly with connection markings for the bridge circuit of FIG. 17 and detail with various leads marker for voltage denominations.
Figure 17:
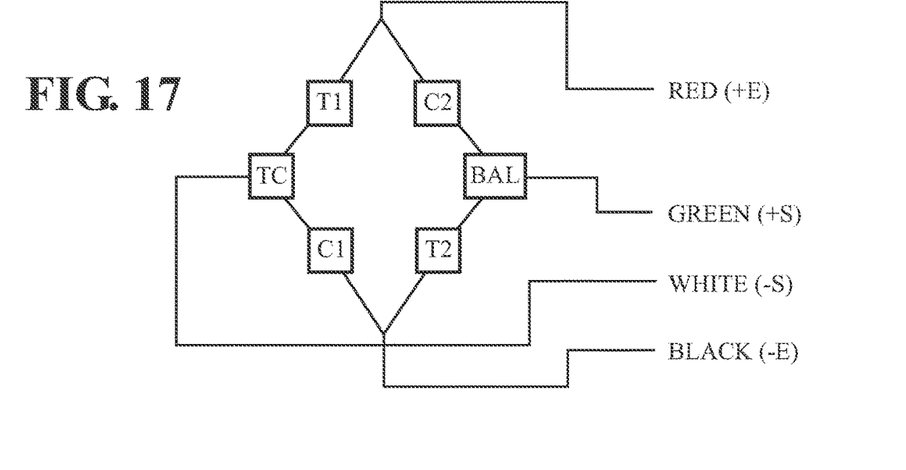
FIG. 17 shows the bridge circuit.

FIGS. 16 and 17 together show how the leads and/or wires are connected to the bridge circuit to provide a supply voltage via the red and black conductors while signals are taken from the bridge via the green and white conductors. Then letters T stand for gages that react to tension and the letters C stand for gages that respond to compression. TC stands for tension and compression while BAL stands for an unbalance condition that provides an output voltage.

In all embodiments the flexure body is as shown and is mechanically connected to the medium by crimping the extensions 14 sufficiently to make an effectively permanent connection. The leads, and the solder connections, exclusive of the plug embodiment, are protected against accidental disconnection by circumferential wrapping about the flexure and the jacket to avoid disruption and creating a potentially life threatening situation.

It is to be understood the invention as has been described with reference to a number of illustrative embodiments and the various modifications and additions can be made without departing from the scope and content of the appended claims.

TABLE OF REFERENCE NUMBERS 10 sensor
12 flexure body
14 tubular extensions
16 not used
18 longitudinal passage
20 medium; wire
22 rounded side surface
24 rounded side surface
26 top and bottom planar exterior surfaces of flexure body
28 shoulder
30 lateral aperture
32 lateral slot
34 lateral slot
40 solder pads
42 jacket
44 rounded side of jacket
46 rounded side of jacket
48 lead carrier
50 leads
52 first leg portion of lead carrier 48

53 slot
54 2nd leg portion of lead carrier 48
55 slot
56 3rd leg portion of lead carrier 48
58 longer portion of lead carrier 48
60 lead carrier portion
62 lead carrier portion
64 lead carrier portion
66 arch on jacket
68 passage
70 wires
72 FCP plug

What is claimed:

1. A method for measuring tension in a linear transmission medium using a sensor comprising a flexure body having a longitudinal axis, a circumferential exterior surface, opposite ends, a longitudinal bore extending into said ends and into tubular extensions at each of said ends and aligned with said axis, said body having strain sensing means mounted on a portion of said circumferential exterior surface where stress is concentrated for producing electrical signals representing elastic deformation in the flexure body, said method comprising the steps of:
passing said medium into said tubular extensions;
deforming said extensions to make connections of said extensions to said medium; and
applying a force via said medium and flexure body thereby elastically deforming said flexure body and producing electrical signals;
wherein said sensor further includes connective leads extending from said circuit and wrapping circumferentially around flexure body; and
the method further comprises the step of connecting said leads to a device for receiving said electrical signals.

2. The method defined in claim 1 wherein said tubular extensions are formed integrally and seamlessly with said flexure body.

3. A sensor for measuring tension in a linear force transmission medium comprising:
a sensor body having a longitudinal axis of symmetry, a circumferential exterior surface, opposed ends;
said body further including tubular extensions extending from said ends and a bore extending at least into said extensions along said axis;
strain gages attached to a portion of said surface and connected into a bridge circuit for producing electrical signals representing elastic deformation in said body caused by longitudinal tensile force applied to said body at and between said tubular extensions; and
electrical leads attached to and extending laterally from said strain sensing means and circumferentially around said body and extending away from said body for attachment to a signal receiving device.

4. A sensor as defined in claim 3 wherein the body is formed with rounded side surfaces joined by a least one planar surface, said body further includes a lateral bore extending through the body and intersection said longitudinal axis and a slot formed in and extending laterally across said planar surface parallel to said lateral bore and longitudinally spaced therefrom to produce stress concentrating areas in said flexure body; and
strain sensing means mounted on said planar surface in proximity to said stress concentrating area so as to be affected by elastic deformation and stress in said concentrating areas to produce electrical signals.

5. A sensor as defined in claim 4 further including a flexible insulative lead carrier film strip carrying said leads and extending laterally from said strain sensing means and wrapping fully around said body to prevent separation of said leads from strain sensing means due to incidental tension.

6. A sensor as defined in claim 5 further comprising a jacket configured to form fit around and to the rounded exterior circumferential surfaces of the flexure body; said jacket providing on its exterior a support for said lead carrier.

7. A sensor as defined in claim 6, wherein the flexure body has two opposite planar exterior surface portions each carrying some of said strain sensing means, said rounded opposite side surfaces joining said planar surface portions, and the jacket is configured to contact and fit against said rounded side surfaces and to provide slot openings over said planar surfaces for portions of said lead carrier to extend from connection points on the planar surfaces under said jacket and onto the exterior surface thereof.

8. A sensor as defined in claim 3 wherein the tubular extensions are integral with and made of the same material as the flexure body.

9. A sensor as defined in claim 8 wherein the tubular extensions are attached to the medium by crimping.

10. A sensor as defined in claim 3 wherein the flexure body is on the order of 5 mm long.

11. A sensor for application to force carrying medium comprising:
a flexure body having a circumferential outside surface and a longitudinal passage into which the medium can extend; the body being configured to produce an area of stress concentration therein; said body being further connected to said medium at longitudinally spaced locations along said passage such that forces in the medium are transmitted to the body and cause deformation in said area of stress concentration;
a strain gage bridge circuit being mounted on said body with half of the bridge circuit being mounted on a top outside surface portion of the body and another half of the bridge circuit being mounted on a bottom outside surface portion of the body; and
a lead carrier with leads attached to the bridge circuit wrapped substantially fully circumferentially around the flexure body for carrying signals from said bridge circuit to a remote readout device.

12. A sensor as described in claim 11 further including a jacket fitted to and around the flexure body wherein said lead carrier is in contact with the jacket surface.

13. A sensor as defined in claim 12 wherein the jacket has a top arch defining a through passage thereunder; said lead carrier and the leads thereon passing through said arch passage.

* * * * *